(12) United States Patent
Choi et al.

(10) Patent No.: US 12,030,082 B2
(45) Date of Patent: Jul. 9, 2024

(54) BILAYER COMPOSITION FOR SURFACE TREATMENT OF STEEL PLATE AND SURFACE-TREATED STEEL PLATE USING SAME

(71) Applicant: POSCO, Pohang-si (KR)

(72) Inventors: Chang-Hoon Choi, Pohang-si (KR); Won-Ho Son, Pohang-si (KR); Hee-Jea Eun, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 574 days.

(21) Appl. No.: 17/416,210

(22) PCT Filed: Sep. 18, 2019

(86) PCT No.: PCT/KR2019/012020
§ 371 (c)(1),
(2) Date: Jun. 18, 2021

(87) PCT Pub. No.: WO2020/130295
PCT Pub. Date: Jun. 25, 2020

(65) Prior Publication Data
US 2022/0055067 A1    Feb. 24, 2022

(30) Foreign Application Priority Data
Dec. 19, 2018  (KR) ........................ 10-2018-0165449

(51) Int. Cl.
*B05D 7/14*   (2006.01)
*B05D 7/00*   (2006.01)
(Continued)

(52) U.S. Cl.
CPC ................. *B05D 7/14* (2013.01); *B05D 7/52* (2013.01); *C09D 5/086* (2013.01); *C09D 7/61* (2018.01);
(Continued)

(58) Field of Classification Search
None
See application file for complete search history.

(56) References Cited

U.S. PATENT DOCUMENTS

2002/0148538 A1   10/2002  Yoon et al.
2008/0197020 A1*   8/2008  Witteler ................. C09D 5/008
                                              427/299
(Continued)

FOREIGN PATENT DOCUMENTS

CN        103374715 A      10/2013
CN        108300988 A       7/2018
(Continued)

OTHER PUBLICATIONS

Jung—KR 2010-0079864 A—PCT D3—MT—metal surface treatment—2010 (Year: 2010).*
(Continued)

*Primary Examiner* — John Vincent Lawler
(74) *Attorney, Agent, or Firm* — CANTOR COLBURN LLP

(57) ABSTRACT

Provided is a bilayer composition for surface treatment of a steel plate and a surface-treated steel plate using same. The bilayer composition for surface treatment of a steel plate, comprising an undercoat coating composition including 1 to 12 wt % of a phenoxy resin, 0.001 to 1.0 wt % of colloidal silica, 0.001 to 1.0 wt % of a silane coupling agent, 0.1 to 1.0 wt % of a corrosion inhibitor, 0.001 to 1.0 wt % of a phosphoric acid compound as a long-term corrosion resistance improving agent, and a balance of water; and a topcoat coating composition including 0.1 to 5.0 wt % of an acrylic acid resin, 30 to 50 wt % of colloidal silica, 40 to 60 wt % of alkoxy silane, 5 to 15 wt % of an acrylate-based monomer, 0.01 to 1.00 wt % of an acidity control agent, and a balance of an organic solvent.

14 Claims, 1 Drawing Sheet

(51) Int. Cl.
*C09D 5/08* (2006.01)
*C09D 7/61* (2018.01)
*C09D 7/63* (2018.01)
*C09D 133/08* (2006.01)
*C09D 171/00* (2006.01)

(52) U.S. Cl.
CPC ............ *C09D 7/63* (2018.01); *C09D 133/08* (2013.01); *C09D 171/00* (2013.01); *B05D 2202/15* (2013.01)

(56) References Cited

U.S. PATENT DOCUMENTS

| | | | | |
|---|---|---|---|---|
| 2011/0111130 | A1* | 5/2011 | Hickl | B05D 7/544 427/388.2 |
| 2014/0011048 | A1 | 1/2014 | Kwak et al. | |
| 2016/0215361 | A1 | 7/2016 | Yoon et al. | |
| 2020/0032080 | A1 | 1/2020 | Choi et al. | |

FOREIGN PATENT DOCUMENTS

| | | | | |
|---|---|---|---|---|
| JP | H05317806 | | 12/1993 | |
| JP | 2009051196 | | 3/2009 | |
| JP | 2014237880 | | 12/2014 | |
| KR | 20010109931 | | 12/2001 | |
| KR | 20030047469 | | 6/2003 | |
| KR | 20030047470 | | 6/2003 | |
| KR | 20080046114 | | 5/2008 | |
| KR | 2010/0079864 A | * | 7/2010 | ............ C23C 22/07 |
| KR | 20100079864 | | 7/2010 | |
| KR | 20120011258 | | 2/2012 | |
| KR | 20120011259 | | 2/2012 | |
| KR | 20120032886 | | 4/2012 | |
| KR | 20120032887 | | 4/2012 | |
| KR | 20120109924 | | 10/2012 | |
| KR | 20120112839 | | 10/2012 | |
| KR | 20130022874 | | 3/2013 | |
| KR | 20130143374 | | 12/2013 | |
| KR | 20130143375 | | 12/2013 | |
| KR | 20140137942 | | 12/2014 | |
| KR | 20150029468 | | 3/2015 | |
| KR | 20150049503 | | 5/2015 | |
| KR | 20150057815 | | 5/2015 | |
| KR | 20150062176 | | 6/2015 | |
| KR | 20150066333 | | 6/2015 | |
| KR | 2015/0080012 A | * | 7/2015 | ............ B32B 15/08 |
| KR | 20150080012 | | 7/2015 | |
| KR | 101560902 | | 10/2015 | |
| KR | 20160083313 | | 7/2016 | |
| KR | 20170012966 | | 2/2017 | |
| KR | 20180035283 | | 4/2018 | |
| WO | 2008062984 | | 5/2008 | |

OTHER PUBLICATIONS

Yuasa—KR 2015-0080012 A—PCT D1—MT—coated plated steel—2015 (Year: 2015).*

International Search Report—PCT/KR2019/012020 dated Jan. 3, 2020.

* cited by examiner

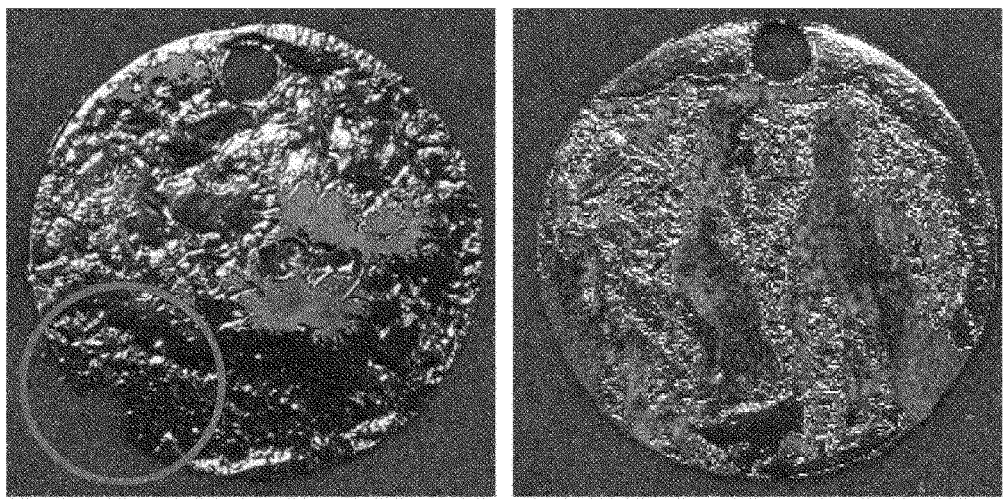

BILAYER COMPOSITION FOR SURFACE TREATMENT OF STEEL PLATE AND SURFACE-TREATED STEEL PLATE USING SAME

TECHNICAL FIELD

The present disclosure relates to a bilayer composition for surface treatment of a steel plate and a surface-treated steel plate using the same, and, more specifically, to a bilayer composition for surface treatment of a steel plate, having excellent corrosion resistance to acid, and a surface-treated steel plate using the same.

BACKGROUND ART

When sulfur oxide, nitrogen oxide, or the like meets moisture, it may become a strong acid such as sulfuric acid, nitric acid, or the like, and facilities such as a heat exchanger, a duct, or the like of a thermal power plant may be exposed to a corrosive environment caused by such a strong acid. Therefore, in order to reduce dew point corrosion, an expensive stainless steel plate, enameled steel plate, or the like may be used, or sulfuric acid-resistant steel plate or the like, being relatively inexpensive and having high resistance to dew point corrosion, may be applied. That is, steel plates having resistance to sulfuric acid corrosion or sulfuric acid-hydrochloric acid composite corrosion may be used as materials for desulfurization equipment and denitrification equipment in a thermal power plant in which sulfuric acid corrosion or sulfuric acid-hydrochloric acid composite corrosion is serious, due to sulfuric acid and hydrochloric acid produced by a reaction between moisture and exhaust gas containing sulfurous acid gas and chlorine gas generated when fossil fuels such as coal or petroleum are combusted, pipes of a combined cycle power plant, heat elements of a gas-gas heater (GGH) required to be made of relatively thick steel plates, or the like.

In general, it has commonly been known that a large amount of copper (Cu) may be added to steel having resistance to sulfuric acid-hydrochloric acid composite corrosion so as to decrease the rate of corrosion in a composite atmosphere of sulfuric acid and hydrochloric acid, as compared to the rate of corrosion of normal steels. Although copper (Cu) is more effective than other alloying elements in decreasing the rate of sulfuric acid corrosion, copper (Cu) added in large amounts may cause problems such as formation of cracks in steel plates during a hot-rolling process.

In addition, as described above, although the corrosion resistance of steel plates resistant to sulfuric acid-hydrochloric acid composite corrosion is improved as the content of copper (Cu) is increased, copper (Cu) is a relatively expensive alloying element, and thus production costs may be increased in proportion to the amount of copper (Cu). In addition, copper (Cu), having a low melting point, may be segregated or may easily cause cracks, even if only a small amount of deformation occurs in copper-rich regions. Therefore, cracks may easily be formed in portions such as slab corners undergoing a large amount of processing during a continuous casting process, and thus, surface defects undergoing corrosion earlier that other portions may remain after a hot-rolling process.

Korean Patent Registration No. 10-1560902 discloses a technology for improving complex corrosion resistance by adding Sb as an example of a composition of a steel plate and controlling the cooling conditions appropriately after hot-rolling. However, there may be a problem that the prior art was intended to improve corrosion resistance by adjustment of components of the steel plate itself, and difficult to apply other than a specific steel plate.

A corrosion reaction may proceed on a surface of a structure. In this case, most of materials, except for enameled steel plate, may be used on the surface without a separate coating layer. Therefore, it may be expected to be widely applied in related fields if a technology that improves corrosion resistance to strong acids including the above-described dew point corrosion and extends a life span of a product is developed by coating on the surface of the steel plate rather than the adjustment of composition of the steel plate itself.

DISCLOSURE

Technical Problem

An aspect of the present disclosure is to provide a bilayer composition for surface treatment of a steel plate, capable of improving corrosion resistance to a strong acid.

Another aspect of the present disclosure is to provide a method for surface treatment using the bilayer composition of the present disclosure.

Another aspect of the present disclosure is to provide a surface-treated steel plate having improved corrosion resistance to a strong acid, prepared using the bilayer composition of the present disclosure.

Technical Solution

According to an aspect of the present disclosure, a bilayer composition for surface treatment of a steel plate, comprising an undercoat coating composition and a topcoat coating composition applied to the undercoat coating composition to be dried, wherein the undercoat coating composition comprising: 1 to 12 wt % of a phenoxy resin, 0.001 to 1.0 wt % of colloidal silica, 0.001 to 1.0 wt % of a silane coupling agent, 0.1 to 1.0 wt % of a corrosion inhibitor, 0.001 to 1.0 wt % of a phosphoric acid compound as a long-term corrosion resistance improving agent, and a balance of water, based on a total weight of the undercoat coating composition; and wherein the topcoat coating composition comprising: 0.1 to 5.0 wt % of an acrylic acid resin, 30 to 50 wt % of colloidal silica, 40 to 60 wt % of alkoxy silane, 5 to 15 wt % of an acrylate-based monomer, 0.01 to 1.00 wt % of an acidity control agent, and a balance of an organic solvent, based on a total weight of the topcoat coating composition.

According to an aspect of the present disclosure, a method for surface treatment of a steel plate for improving corrosion resistance, using the bilayer composition of the present disclosure, includes applying the undercoat coating composition to the steel plate to form an undercoat layer; drying the undercoat layer at a temperature of 40 to 80° C.; applying the topcoat coating composition to the steel plate to form a topcoat layer; and drying the topcoat layer at a temperature of 200 to 300° C.

According to an aspect of the present disclosure, a surface-treated steel plate, prepared using the bilayer composition of the present disclosure, includes a surface treatment layer on which an undercoat layer formed of the undercoat coating composition and a topcoat layer disposed on the undercoat layer and formed of the topcoat coating composition are stacked, on at least one surface of the surface treatment layer.

Advantageous Effects

Since a coating formed using a solution composition for surface treatment of the present disclosure may provide excellent corrosion resistance against an acid for a long time, according to the present disclosure, a chemically coated steel plate having strong corrosion resistance against a strong acid such as sulfuric acid, hydrochloric acid, or the like may be produced.

DESCRIPTION OF DRAWINGS

FIG. 1 is a photograph showing a specimen of Experimental Example 1 (right) having good results and a specimen of Comparative Experimental Example 11 (left) from which corners were removed due to local corrosion, in a long-term corrosion resistance evaluation.

BEST MODE FOR INVENTION

Hereinafter, preferred embodiments of the present disclosure will be described with reference to the accompanying drawings. However, embodiments of the present disclosure may be modified into various other forms, and the scope of the present disclosure is not limited to embodiments described below.

According to the present disclosure, there may be provided a bilayer composition for surface treatment of a steel plate, capable of improving corrosion resistance and extending a life span of a product by applying a coating having strong resistance to a strong acid on a surface of the steel plate.

The bilayer composition of the present disclosure may include an undercoat coating composition and a topcoat coating composition.

More specifically, the bilayer composition of the present disclosure may comprise an undercoat coating composition including 1 to 12 wt % of a phenoxy resin, 0.001 to 1.0 wt % of colloidal silica, 0.001 to 1.0 wt % of a silane coupling agent, 0.1 to 1.0 wt % of a corrosion inhibitor, 0.001 to 1.0 wt % of a phosphoric acid compound as a long-term corrosion resistance improving agent, and a balance of water, based on a total weight of the undercoat coating composition; and a topcoat coating composition applied to the undercoat coating composition to be dried, and including 0.1 to 5.0 wt % of an acrylic acid resin, 30 to 50 wt % of colloidal silica, 40 to 60 wt % of alkoxy silane, 5 to 15 wt % of an acrylate-based monomer, 0.01 to 1.00 wt % of an acidity control agent, and a balance of an organic solvent, based on a total weight of the topcoat coating composition.

In the undercoat coating composition, the phenoxy resin may form a film forming an undercoat after coating, and may be included in an amount of 1 to 12 wt %, preferably 2 to 8 wt %, based on the total weight of the undercoat coating composition. When an amount of the phenoxy resin is less than 1 wt %, corrosion resistance may not be secured due to insufficient film formation, and when an amount of the phenoxy resin exceeds 12 wt %, a degree of curing may not be sufficiently secured due to excessive resin components. Therefore, film peeling may occur, thus not securing corrosion resistance.

In the undercoat coating composition, the phenoxy resin may be, for example, at least one resin selected from the group consisting of a bisphenol A type phenoxy resin, a bisphenol F type phenoxy resin, a bisphenol AF type phenoxy resin, a bisphenol S type phenoxy resin, a bromide bisphenol A type phenoxy resin, a bromide bisphenol F type phenoxy resin, and a phosphorus-containing phenoxy resin.

The silane coupling agent of the undercoat coating composition may be used as an adhesion improving agent to improve adhesion between the undercoat and the steel plate, to improve water resistance and corrosion resistance of the surface-treated steel plate, and may be included in an amount of 0.001 to 1.0 wt %, preferably 0.05 to 0.5 wt %, based on the total weight of the undercoat coating composition. When an amount of the silane coupling agent is less than 0.001 wt %, corrosion resistance may not be secured due to poor adhesion to the steel plate, and when an amount of the silane coupling agent exceeds 1.0 wt %, corrosion resistance may be inferior due to effects of remaining portions of the adhesion improving agent.

The silane coupling agent may be, for example, at least one selected from the group consisting of vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropyltrimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane.

The corrosion inhibitor of the undercoat coating composition may improve corrosion resistance and may improve film strength, and the corrosion inhibitor may be included in an amount of 0.1 to 1.0 wt %, preferably 0.3 to 0.8 wt %, based on the total weight of the undercoat coating composition. When an amount of the corrosion inhibitor is less than 0.1 wt %, corrosion resistance may not be secured, and when an amount of the corrosion inhibitor exceeds 1.0 wt %, processability may be inferior due to excessive strength.

A type of the corrosion inhibitor in the undercoat coating composition for metal surface treatment of the present disclosure is not particularly limited, and may be, for example, at least one selected from the group consisting of hexafluorozirconic acid, hexafluorotitanic acid, ammonium hexafluorozirconate, and ammonium hexafluorotitanate.

The long-term corrosion resistance improving agent of the undercoat coating composition may be used to improve long-term corrosion resistance in an acid environment. As an example, a phosphoric acid compound may be used, and the phosphoric acid compound may be included in an amount of 0.001 to 1.0 wt %, preferably 0.05 to 0.5 wt %, based on the total weight of the undercoat coating composition. When an amount of the long-term corrosion resistance improving agent is less than 0.001 wt %, long-term corrosion resistance may not be secured, and when an amount of the long-term corrosion resistance improving agent exceeds 1.0 wt %, atmospheric corrosion resistance may be inferior due to effects of remaining portions of the long-term corrosion resistance improving agent.

The phosphoric acid compound may be at least one selected from the group consisting of polyphosphoric acid, phosphoric acid, zinc phosphate, manganese phosphate, phosphoric acid derivatives, and phosphorous acid, and preferably a phosphoric acid mixture obtained by mixing phosphoric acid and manganese phosphate in a weight ratio of 1:2 to 2:1. In using such a phosphoric acid mixture, there may be an excellent effect such as particularly high adhesion to a coated film.

The colloidal silica of the undercoat coating composition may serve to improve corrosion resistance, and may be, for example, an aqueous colloidal silica having a solid content of 20 to 30 wt %. The colloidal silica may be included in an amount of 0.001 to 1.0 wt %, preferably 0.05 to 0.5 wt %, based on the total weight of the undercoat coating composition. When an amount of the colloidal silica is less than 0.001 wt %, corrosion resistance may not be secured, and when an amount of the colloidal silica exceeds 1.0 wt %, adhesion to a topcoat may be deteriorated and corrosion resistance may not be secured.

In this case, the colloidal silica of the undercoat coating composition may include those having a particle size of preferably 5 to 50 nm, and an aqueous colloidal silica having a solid content of 20 to 30 wt % may be preferable.

The undercoat coating composition may use water as a solvent, and thus may contain a balance of water.

The topcoat coating composition of the bilayer composition of the present disclosure may include an inorganic binder by a sol-gel method, which may be obtained using a metal alkoxide precursor having excellent reactivity to perform a low-temperature reaction and by drying and curing processes that proceeds from a colloidal sol to a gel. In more detail, in the topcoat coating composition of the present disclosure, an intermediate may be formed by a sol-gel reaction between colloidal silica of nanoparticles and a trivalent alkoxysilane, an acrylate-based monomer as an organic monomer may be further reacted thereto to synthesize a main resin, and acrylic acid resin may be then added thereto.

The topcoat coating composition may include 0.1 to 5.0 wt % of an acrylic acid resin, 30 to 50 wt % of colloidal silica, 40 to 60 wt % of alkoxy silane, 5 to 15 wt % of an acrylate-based monomer, 0.01 to 1.00 wt % of an acidity control agent, and a balance of an organic solvent, based on a total weight of the topcoat coating composition.

In the topcoat coating composition of the present disclosure, the acrylic acid resin may serve to improve adhesion to a material to be coated and may improve drying properties, and may be included in an amount of 0.1 to 5.0 wt %, preferably 1.0 to 3.0 wt %, based on the total weight of the topcoat coating composition. When an amount of the acrylic acid resin is less than 0.1 wt %, adhesion to the material may be inferior or not easily dried during coating, not to secure corrosion resistance, and when an amount of the acrylic acid resin exceeds 5.0 wt %, water resistance may decrease to occur a film peeling phenomenon or the like.

A specific type of the acrylic acid resin in the bilayer composition of the present disclosure is not particularly limited, but may be at least one selected from the group consisting of poly(meth)acrylic acid, a copolymer of acrylic acid and methacrylic acid, and a copolymer of ethylene and acrylic monomers, and furthermore, polyvinyl alcohol, a copolymer of ethylene and vinyl acetate, polyurethane, an amino-modified phenol resin, a polyester resin, an epoxy resin, or a hybrid resin or a mixture resin thereof may be used.

The colloidal silica of the topcoat coating composition may be, for example, an aqueous colloidal silica having a solid content of 20 to 30 wt %, and the colloidal silica may be included in an amount of 30 to 50 wt %, preferably 35 to 45 wt %, based on the total weight of the topcoat coating composition. When an amount of the colloidal silica is less than 30 wt %, it may not be sufficiently bonded with alkoxy silane to reduce hardness and secure corrosion resistance, and when an amount of the colloidal silica exceeds 50 wt %, silica unbound with silane may remain, film formation may be deteriorated, and corrosion resistance may not be secured due to this.

In this case, the colloidal silica may include those having a particle size of preferably 5 to 50 nm, and an aqueous colloidal silica having a solid content of 20 to 30 wt % may be preferable.

The alkoxy silane of the topcoat coating composition may be included in an amount of 40 to 60 wt %, preferably 45 to 55 wt %, based on 100 parts by weight of the total weight of the topcoat coating composition. When an amount of the alkoxy silane is less than 40 wt %, a coating film may not be formed due to insufficient bonding with colloidal silica, and corrosion resistance may not be secured. When an amount of the alkoxy silane exceeds 60 wt %, organic gas may be discharged due to thermal decomposition. In addition, since a large amount of silanol remains, adhesion to the coating film may be impaired, and corrosion resistance may not be secured due to this.

The alkoxy silane of the topcoat coating composition may be preferably a silane having three or more alkoxy groups and which may be stabilized after hydrolysis, and may be, for example, at least one selected from the group consisting of vinylvinyltrimethoxysilane, vinyltriethoxysilane, vinyltriisopropoxysilane, 3-methacryloxypropyltrimethoxysilane, 2-glycidyloxypropyltrimethoxysilane, 2-glycidyloxypropyltriethoxysilane, 2-aminopropyltriethoxysilane, 2-ureidoalkyltriethoxysilane, tetraethoxysilane, triethoxyphenylsilane, and trimethoxyphenylsilane.

The acrylate-based monomer of the topcoat coating composition may contribute to formation of a coating film and crosslinking reaction during coating, and may be included in an amount of 5 to 15 wt %, preferably 7 to 13 wt %, based on the total weight of the topcoat coating composition. When an amount of the acrylate-based monomer is less than 5 wt %, sufficient bonds with silica and synthetic silane polymers may not be formed to deteriorate formation of the coating film, and corrosion resistance may not be secured. When an amount of the acrylate-based monomer exceeds 15 wt %, water resistance may decrease or corrosion resistance may decrease, due to unreacted remaining portions of the acrylate-based monomer.

The acrylate-based monomer of the topcoat coating composition may be at least one selected from the group consisting of acrylic acid (glacial), methyl acrylate, ethyl acrylate, butyl acrylate, 2-ethylhexyl acrylate, isobutyl acrylate, tert-butyl acrylate, tert-butyl methacrylate, butanediol monoacrylate, lauryl acrylate, dimethylaminoethyl acrylate, and dihydrodicyclopentadienyl acrylate, but is not limited thereto.

In the topcoat coating composition of the present disclosure, the acidity control agent may serve to improve stability of the silane while helping hydrolysis of the silane, and may be included in an amount of 0.01 to 1.00 wt %, preferably 0.05 to 0.8 wt %, based on the total weight of the topcoat coating composition. When an amount of the acidity control agent is less than 0.01 wt %, a period in hydrolysis time may increase and solution stability of the entire resin composition may decrease. When an amount of the acidity control agent exceeds 1.00 wt %, corrosion of the steel plate may occur, and control of the molecular weight of the resin may become difficult.

The acidity control agent of the topcoat coating composition may be an organic acid, an inorganic acid, or a combination thereof, and, more specifically, may include one or more selected from the group consisting of an organic acid such as acetic acid, formic acid, latic acid, glyconic acid, and the like; an organic-inorganic acid such as sulfuric acid, nitric acid, hydrochloric acid, hydrofluoric acid, and the like; and a mixture thereof.

The topcoat coating composition may use an organic solvent used as a solvent, and the organic solvent of the topcoat coating composition may be alcohol. In this case, the solvent may play a role of controlling compatibility and hydrolysis of silane with regard to water, wetting of a metal surface of a resin composition, control of a drying rate, or the like, and may be included as a balance, but preferably may be included in an amount of 1 to 15 wt %, based on the total weight of the topcoat coating composition. When an amount of the organic solvent is less than 1 wt %, compatibility may be lowered to deteriorate storage of a coating solution, and corrosion resistance may not be secured after coating. When an amount of the organic solvent exceeds 15 wt %, viscosity may be too low to decrease stability of a solution, and corrosion resistance may not be secured after coating.

A specific type of the organic solvent in the topcoat coating composition of the present disclosure may not be particularly limited, but may include, for example, alcohol, preferably one or more selected from the group consisting of methanol, ethanol, 2-propanol, 2-methoxypropanol, 2-butoxyethanol, and the like.

Further, the topcoat coating composition of the present disclosure may additionally contain 0.01 to 12.00 wt % of a long-term corrosion resistance increasing agent. In this case, the long-term corrosion resistance increasing agent in the topcoat coating composition of the present disclosure may serve to improve local corrosion occurring in a long-term corrosion resistance evaluation, to enhance uniformity of thicknesses of remaining materials, and may be included in an amount of 0.01 to 12.00 wt %, preferably 0.1 to 8 wt %, based on the total weight of the topcoat coating composition. When an amount of the long-term corrosion resistance increasing agent is less than 0.01 wt %, a long-term corrosion resistance improvement effect may be insignificant, and when an amount of the long-term corrosion resistance increasing agent exceeds 12.00 wt %, a long-term corrosion resistance improvement effect may be insignificant, and solution stability may be deteriorated.

In the topcoat coating composition, the long-term corrosion resistance increasing agent may preferably include a compound such as cerium, potassium, ammonium, rubidium, cesium, thallium, and the like, and for example, the long-term corrosion resistance increasing agent of the topcoat coating composition may be at least one selected from the group consisting of cerium (III) nitrate, hydronium cerium nitrate hydrate, cerium nitrate hexahydrate, cerium (IV) nitrate, dipotassium diaquapentanitratocerate, dipotassium hexanitratocerate, tripotasium diseriumnitrate, diammonium diaquapentanitratocerate dihydrate, dirubidium diaquapentanitratocerate dihydrate, dicesium diaquapentanitratocerate dihydrate, dithallium diaquapentanitratocerate dihydrate, bis{4-[(4H-1,2,4-triazol-4-yl)iminomethyl] pyridinium}diaquapentanitratocerate(III), 1,10-phenanthroline-H-diaquapentanitratocerate, hydronium cerium nitrate hydrate, ceric magnesium nitrate, ceric zinc nitrate, ceric nickel nitrate, ceric cobalt nitrate, and ceric manganese nitrate.

A bilayer composition for surface treatment of a steel plate, of the present disclosure, may comprise an undercoat coating composition and a topcoat coating composition, which does not mean that an undercoat coating composition and a topcoat coating composition are mixed. The topcoat coating composition may be applied to the undercoat coating composition to be dried. For example, the undercoat coating composition and the topcoat coating composition may be stored in separate containers before being applied to an object to be coated.

According to another aspect of the present disclosure, there may be provided a method for surface treatment of a steel plate for improving corrosion resistance, using the bilayer composition of the present disclosure.

In more detail, a method for surface treatment of a steel plate for improving corrosion resistance, using the bilayer composition of the present disclosure, may include applying the undercoat coating composition to the steel plate to form an undercoat layer; drying the undercoat layer at a temperature of 40 to 80° C.; applying the topcoat coating composition to the steel plate to form a topcoat layer; and drying the topcoat layer at a temperature of 200 to 300° C.

In this case, an adhesion amount of the undercoat coating composition is not particularly limited. Preferably, the undercoat coating composition may be coated in an adhesion amount of 1 to 1000 mg/m$^2$. In a coating mainly composed of inorganic components, such as the undercoat layer of the present disclosure, an adhesion amount (mg/m$^2$) indicating how much of a specific component such as silicone is coated over an entire area using analysis equipment such as XRF may be determined.

A thickness of the undercoat coating layer is not particularly limited, but may be, for example, 0.001 to 10 μm.

The undercoat layer may be dried at a temperature of 40 to 80° C., preferably 50 to 70° C. When a drying temperature is less than 40° C., there may be problems such as peeling of a coating layer or the like due to non-drying or slow drying, under conditions of continuous production in which a steel coil flows rapidly, and when a drying temperature exceeds 80° C., there may be problems such as a decrease in corrosion resistance due to latent heat, peeling of a coating film, or the like, under conditions of continuous production in which steel coils flow rapidly.

A thickness of the topcoat coating layer may not be particularly limited, but preferably may be 0.1 μm to 50 μm.

The topcoat layer may be dried at a temperature of 200 to 300° C., preferably 230 to 280° C. When a drying temperature is less than 200° C., there may be problems such as peeling of a coating layer, deterioration of corrosion resistance, or the like due to non-drying or slow drying, under conditions of continuous production in which a steel coil flows rapidly, and when a drying temperature exceeds 300° C., there may be problems such as peeling of a coating film, a decrease in corrosion resistance, or the like due to excessive heating.

According to such a method, a surface-treated steel plate, prepared using the bilayer composition of the present disclosure, including a surface treatment layer on which an undercoat layer formed of the undercoat coating composition and a topcoat layer disposed on the undercoat layer and formed of the topcoat coating composition are stacked, on at least one surface of the surface treatment layer, may be obtained.

A steel plate to which the bilayer composition of the present disclosure may be applied is not particularly limited, but may be selected from a stainless steel plate, a carbon steel plate, ANCOR steel plate, and the like.

A coating formed using the composition for surface treatment of the present disclosure may provide excellent corrosion resistance against acid corrosion for a long time. Therefore, according to the present disclosure, a chemical resistant coated steel plate having strong corrosion resistance against a strong acid such as sulfuric acid, hydrochloric acid, or the like, may be obtained.

Hereinafter, the present disclosure will be described in more detail through specific examples. The following examples are only illustrative to aid understanding of the present disclosure, and the scope of the present disclosure is not limited thereto.

MODE FOR INVENTION

Example

1. Preparation of Bilayer Solution Composition for Surface Treatment of Steel Plate (1) Undercoat Coating Composition Phosphoric acid and manganese phosphate, as long-term corrosion resistance improving agents, were added to distilled water in a 1:1 weight ratio to adjust pH to 4.0±1.5, colloidal silica (Ludox HAS, 30% solid content, particle size 12 nm, WR Grace & Co. Conn.), glycidoxypropyltrimethoxysilane, which was a silane coupling agent as an adhesion improving agent, and hexafluorozirconic acid as a corrosion inhibitor were added thereinto, respectively, and a mixture therefrom was then stirred at room temperature for about 1 hour.

(2) Topcoat Coating Composition

Tetraethoxysilane as a silane, ethanol as a solvent, and acetic acid as an acidity control agent were added to colloidal silica (Ludox HAS, 30% solid content, particle size 12 nm, WR Grace & Co. Conn.), respectively, and a mixture therefrom was cooled not to exceed a temperature of about 50° C., and was stirred for about 5 hours. In this case, the colloidal silica was surface modified by the silane, and the silane was hydrolyzed. After performing sufficiently the reaction, ethyl acrylate as a monomer, poly (meth) acrylic acid as an organic resin, and cerium nitrate as a long-term corrosion resistance improving agent were added thereinto, respectively, to be reacted for an additional 24 hours.

Undercoat coating compositions prepared to have compositions, illustrated in Table 1 below, were bar-coated on a surface of a 1.2 mm-thick steel plate, and were put and dried in an oven at about 60° C. to form a undercoat layer, and topcoat coating compositions prepared to have compositions, illustrated in Table 2 below, were bar-coated on a surface of the steel plate on which the undercoat layer was coated, and were put and cured in the oven at about 250° C., to prepare a surface-treated steel plate.

In this case, when compositions of undercoat coating compositions were changed, as illustrated in Table 1 below, compositions of topcoat coating compositions used a composition of Inventive Example 9, and when compositions of topcoat coating compositions were changed, as illustrated in Table 2 below, compositions of undercoat coating compositions used a composition of Inventive Example 1.

In order to investigate corrosion characteristics of the prepared surface-treated steel plates under sulfuric acid corrosion conditions, specimens for the surface-treated steel plates were immersed in a 50 vol % sulfuric acid aqueous solution, maintained at 70° C., for 6 hours, and corrosion loss of the specimens were then measured.

In addition, in order to investigate corrosion characteristics of the prepared surface-treated steel plates under sulfuric acid-hydrochloric acid complex corrosion conditions, specimens for the surface-treated steel plates were immersed in a mixed aqueous solution of 16.9 vol % sulfuric acid and 0.35 vol % hydrochloric acid, maintained at 60° C., for 6 hours, and corrosion loss of the specimens were then measured.

TABLE 1

| | Undercoat Coating Composition | | | | | | |
|---|---|---|---|---|---|---|---|
| | Adhesion Amount (mg/m$^2$) | Resin | Colloidal Silica | Adhesion Improving Agent | Corrosion Inhibitor | Long-Term Corrosion Resistance Improving Agent | Distilled Water |
| IE1 | 346 | 1.4% | 0.95% | 0.50% | 0.83% | 1.42% | 94.85% |
| IE2 | 150 | 10.9% | 0.06% | 0.91% | 0.09% | 0.94% | 87.05% |
| IE3 | 837 | 0.7% | 0.76% | 0.72% | 0.58% | 0.58% | 96.67% |
| IE4 | 185 | 4.3% | 0.67% | 0.54% | 0.41% | 0.08% | 94.00% |
| CE1 | 364 | 0.0% | 0.29% | 0.32% | 0.08% | 0.24% | 99.06% |
| CE2 | 760 | 2.0% | 2.10% | 0.89% | 0.59% | 0.98% | 93.43% |
| CE3 | 924 | 11.5% | 0.31% | 3.10% | 0.30% | 1.74% | 83.05% |
| CE4 | 766 | 3.9% | 0.01% | 0.20% | 0.00% | 1.35% | 94.51% |
| CE5 | 115 | 8.7% | 0.90% | 0.27% | 0.74% | 0.00% | 89.36% |
| CE6 | 148 | 6.9% | 0.67% | 0.00% | 0.87% | 1.73% | 89.87% |
| CE7 | 184 | 11.4% | 0.83% | 0.05% | 2.50% | 0.10% | 85.07% |
| CE8 | 471 | 6.2% | 0.60% | 0.23% | 0.99% | 3.70% | 88.24% |
| CE9 | 294 | 1.3% | 0.00% | 0.64% | 0.25% | 0.25% | 97.60% |
| CE10 | 1500 | 3.4% | 0.80% | 0.94% | 0.40% | 1.41% | 93.00% |
| CE11 | 0 | 2.8% | 0.55% | 0.80% | 0.60% | 1.80% | 93.45% |

IE: Inventive Example,
CE: Comparative Example

TABLE 2

Topcoat Coating Composition

| | Coating Layer Thickness (μm) | Colloidal Silica | Silane | Solvent | Acidity Control Agent | Monomer | Organic Resin | Long-Term Corrosion Resistance Increasing Agent |
|---|---|---|---|---|---|---|---|---|
| IE5 | 36 | 36% | 44% | 10.00% | 0.50% | 8.00% | 0.50% | 1.00% |
| IE6 | 19 | 37% | 42% | 3.40% | 0.60% | 6.00% | 0.40% | 10.60% |
| IE7 | 21 | 32% | 42% | 8.00% | 0.60% | 11.00% | 0.40% | 6.00% |
| IE8 | 4 | 35% | 49% | 4.00% | 0.50% | 6.00% | 2.50% | 3.00% |
| CE12 | 35 | 53% | 40% | 1.00% | 0.20% | 5.00% | 0.20% | 0.60% |
| CE13 | 32 | 50% | 22% | 14.00% | 0.80% | 6.50% | 2.40% | 4.30% |
| CE14 | 32 | 38% | 40% | 3.00% | 2.50% | 10.00% | 0.50% | 6.00% |
| CE15 | 43 | 39% | 48% | 0.00% | 0.50% | 5.50% | 0.50% | 6.50% |
| CE16 | 33 | 33% | 41% | 5.00% | 0.60% | 18.00% | 0.40% | 2.00% |
| CE17 | 6 | 36% | 42% | 3.60% | 0.20% | 5.70% | 10.00% | 2.50% |
| CE18 | 1 | 30% | 62% | 1.00% | 0.70% | 5.10% | 0.20% | 1.00% |
| CE19 | 0.03 | 38% | 44% | 3.40% | 0.60% | 10.00% | 0.00% | 4.00% |
| IE9 | 26 | 32% | 45% | 10.00% | 0.60% | 12.00% | 0.40% | 0.00% |
| CE20 | 65 | 32% | 51% | 9.50% | 0.10% | 5.00% | 0.90% | 1.50% |

IE: Inventive Example,
CE: Comparative Example

Properties of surface-treated steel plates using the coating compositions prepared in the Inventive Examples and Comparative Examples were measured by the method shown below.

2. Measurement of Properties of Surface-Treated Steel Plates (1) Sulfuric Acid Corrosion Resistance Specimens were prepared by cutting surface-treated steel plates prepared in the Inventive Examples and Comparative Examples to have a size of 38 mm in diameter, the specimens were immersed in a 50 vol % sulfuric acid aqueous solution, maintained at 70° C., for 6 hours, and corrosion loss of the specimens were then measured. Evaluation criteria for sulfuric acid corrosion resistance were based on the following.

<Evaluation Criteria for Sulfuric Acid Corrosion Resistance>
∘: less than 15 mg/cm$^2$/hr
Δ: 15 mg/cm$^2$/hr or more and less than 65 mg/cm$^2$/hr
x: 65 mg/cm$^2$/hr or more (2) Complex Corrosion Resistance Specimens were prepared by cutting surface-treated steel plates prepared in the Inventive Examples and Comparative Examples to have a size of 38 mm in diameter, the specimens were immersed in a mixed aqueous solution of 16.9 vol % sulfuric acid and 0.35 vol % hydrochloric acid, maintained at 60° C., for 6 hours, and corrosion loss of the specimens were then measured. Evaluation criteria for complex corrosion resistance were based on the following.

<Evaluation Criteria for Complex Corrosion Resistance>
∘: less than 3 mg/cm$^2$/hr
Δ: 3 mg/cm$^2$/hr or more and less than 6 mg/cm$^2$/hr
x: 6 mg/cm$^2$/hr or more (3) Coating Film Adhesion Specimens were prepared by cutting surface-treated steel plates prepared in the Inventive Examples and Comparative Examples to have a size of 150 cm×75 cm (width×length), lines were drawn on surfaces of the specimens using a cross cut guide, to form 100 cells horizontally and vertically at 1 mm intervals, portions in which the 100 cells are formed were pushed up to a height of 6 mm using an Erichsen tester, peeling tapes (NB-1, manufactured by Ichiban) were attached to the pushed portions, and, while removing the peeling tapes from the pushed portions, it was observed whether or not a portion, related to the Ericsson tester, was peeled off. Evaluation criteria for coating film adhesion were based on the following.

<Evaluation Criteria for Coating Film Adhesion>
∘: No peeling of surface
Δ: Occurrence of peeling of 1 to 3 surfaces, among 100 surfaces
x: Occurrence of peeling of more than 3 surfaces, among 100 surfaces (4) Sulfuric Acid Corrosion Resistance After Processing Specimens were prepared by cutting surface-treated steel plates prepared in the Inventive Examples and Comparative Examples to have a size of 38 mm in diameter, the specimens were processed to have a height of 6 mm using an Erichsen tester, the processed specimens were immersed in a 50 vol % sulfuric acid aqueous solution, maintained at 70° C., for 6 hours, and corrosion loss of the specimens were then measured. The evaluation criteria for sulfuric acid corrosion resistance after processing were based on the following.

<Evaluation Criteria for Sulfuric Acid Corrosion Resistance After Processing>
∘: less than 15 mg/cm$^2$/hr
Δ: 15 mg/cm$^2$/hr or more and less than 65 mg/cm$^2$/hr
x: 65 mg/cm$^2$/hr or more (5) Long-Term Corrosion Resistance Corrosion Loss Specimens were prepared by cutting surface-treated steel plates prepared in the Inventive Examples and Comparative Examples to have a size of 38 mm in diameter, the specimens were immersed in a 50 vol % sulfuric acid aqueous solution, maintained at 70° C., for 96 hours, and corrosion loss of the specimens were measured. A weight of each of the specimens after corrosion compared to an initial weight of each of the specimens was measured and expressed as %. Evaluation criteria for sulfuric acid corrosion resistance were based on the following.

<Evaluation Criteria for Sulfuric Acid Corrosion Resistance>
∘: 35% or more of initial thickness
Δ: 12% or more and less than 35% of initial thickness
x: less than 12% of initial thickness (6) Long-Term Corrosion Resistance Minimum Thickness Specimens were prepared by cutting surface-treated steel plates prepared in the Inventive Examples and Comparative Examples to have a size of 38 mm in diameter, and the specimens were immersed in a 50 vol % sulfuric acid aqueous solution, maintained at 70° C., for 96 hours. A thickness of each of the specimens after corrosion compared to an initial thickness of each of the specimens was measured and expressed as %. Evaluation criteria for sulfuric acid corrosion resistance were based on the following.

<Evaluation Criteria for Sulfuric Acid Corrosion Resistance>

○: 25% or more of initial thickness
Δ: 10% or more and less than 25% of initial thickness
x: less than 10% of initial thickness Measurement results of properties of surface-treated steel plates prepared using compositions of Inventive Examples 1 to 4 and Comparative Examples 1 to 10, illustrated in Table 1, as undercoat coating compositions, and a composition of Inventive Example 9, illustrated in Table 2, as a topcoat coating composition, were illustrated in Table 3 below.

TABLE 3

| | Under Coat Layer | Top coat Layer | Sulfuric Acid Corrosion Resistance | Complex Corrosion Resistance | Coating Film Adhesion | Sulfuric Acid Corrosion Resistance After Processing | Long-Term Corrosion Resistance Corrosion Loss | Long-Term Corrosion Resistance Min. Thickness |
|---|---|---|---|---|---|---|---|---|
| IEE1 | IE1 | IE9 | ○ | ○ | ○ | ○ | ○ | ○ |
| IEE2 | IE2 | IE9 | ○ | ○ | ○ | ○ | ○ | ○ |
| IEE3 | IE3 | IE9 | ○ | ○ | ○ | ○ | ○ | ○ |
| IEE4 | IE4 | IE9 | ○ | ○ | ○ | ○ | ○ | ○ |
| CEE1 | CE1 | IE9 | X | X | X | X | X | X |
| CEE2 | CE2 | IE9 | Δ | X | X | X | Δ | Δ |
| CEE3 | CE3 | IE9 | X | X | ○ | X | Δ | X |
| CEE4 | CE4 | IE9 | X | X | ○ | Δ | X | Δ |
| CEE5 | CE5 | IE9 | ○ | ○ | X | X | X | X |
| CEE6 | CE6 | IE9 | X | X | X | X | X | ○ |
| CEE7 | CE7 | IE9 | ○ | ○ | X | X | Δ | ○ |
| CEE8 | CE8 | IE9 | X | X | X | X | X | Δ |
| CEE9 | CE9 | IE9 | X | X | ○ | X | X | X |
| CEE10 | CE10 | IE9 | ○ | ○ | X | ○ | X | X |
| CEE11 | — | IE9 | ○ | ○ | Δ | X | Δ | X |

IE: Inventive Example,
CE: Comparative Example,
IEE: Inventive Experimental Example,
CEE: Comparative Experimental Example As illustrated in Table 3, it can be seen that, when Inventive Examples 1 to 4 according to the present disclosure were used as undercoat coating compositions, sulfuric acid corrosion resistance, complex corrosion resistance, and coating film adhesion were very excellent.

In Comparative Experimental Example 1, it can be seen that since the undercoat solution composition did not contain a resin and no appropriate film was thus formed, corrosion resistance, processability, and the like were inferior. In Comparative Experimental Example 2, it can be seen that since an excessive amount of the colloidal silica was added to the undercoat solution composition to reduce adhesion to the topcoat layer, complex corrosion resistance, coating film adhesion, sulfuric acid corrosion resistance after processing, and the like were inferior. In Comparative Experimental Example 3, it can be seen that since an excessive amount of the silane coupling agent, an adhesion improving agent, was added, sulfuric acid corrosion resistance, complex corrosion resistance, and the like were inferior due to influence of a residual amount in the coating layer. In Comparative Experimental Example 4, it can be seen that since no corrosion inhibitor was included, sulfuric acid corrosion resistance, complex corrosion resistance, long-term corrosion resistance, corrosion reduction, and the like were inferior. In Comparative Experimental Example 5, it can be seen that since no long-term corrosion resistance improving agent was included, long-term corrosion resistance, a long-term corrosion resistance minimum thickness, and the like were inferior. In Comparative Experimental Example 6, it can be seen that since no adhesion improving agent was included, corrosion resistance, coating film adhesion, and the like were inferior due to a decrease in adhesion between the topcoat layer and the undercoat layer. In Comparative Experimental Example 7, it can be seen that since an excessive amount of the corrosion inhibitor was added, processability, coating film adhesion, and the like were inferior. In Comparative Experimental Example 8, it can be seen that since excessive amounts of the phosphoric acid and manganese phosphate, long-term corrosion resistance improving agents, were added, corrosion resistance, coating film adhesion, and the like were inferior due to influence of an excessive amount of the acid. In Comparative Experimental Example 9, it can be seen that since no colloidal silica was included, sulfuric acid corrosion resistance, complex corrosion resistance, and the like were inferior. In Comparative Experimental Example 10, it can be seen that since an adhesion amount of the undercoat layer was too high, coating film adhesion was inferior. In Comparative Experiment 11, it can be seen that since no undercoat layer was coated, sulfuric acid corrosion resistance, long-term corrosion resistance minimum thickness after processing, and the like were inferior.

Measurement results of properties of surface-treated steel plates prepared using compositions of Inventive Examples 5 to 8 and Comparative Examples 12 to 21, illustrated in Table 2, as topcoat coating compositions, and a composition of Inventive Example 1, illustrated in Table 1, as an undercoat coating composition, were illustrated in Table 4 below.

and complex corrosion resistance were deteriorated when an amount of the organic component was larger relative to

TABLE 4

| | Under coat Layer | Top coat Layer | Sulfuric Acid Corrosion Resistance | Complex Corrosion Resistance | Coating Film Adhesion | Sulfuric Acid Corrosion Resistance After Processing | Long-Term Corrosion Resistance Corrosion Loss | Long-Term Corrosion Resistance Min. Thickness |
|---|---|---|---|---|---|---|---|---|
| IEE5 | IE1 | IE5 | ○ | ○ | ○ | ○ | ○ | ○ |
| IEE6 | IE1 | IE6 | ○ | ○ | ○ | ○ | ○ | ○ |
| IEE7 | IE1 | IE7 | ○ | ○ | ○ | ○ | ○ | ○ |
| IEE8 | IE1 | IE8 | ○ | ○ | ○ | ○ | ○ | ○ |
| CEE12 | IE1 | CE12 | X | X | X | ○ | ○ | ○ |
| CEE13 | IE1 | CE13 | X | X | X | ○ | ○ | ○ |
| CEE14 | IE1 | CE14 | | X | ○ | ○ | ○ | ○ |
| CEE15 | IE1 | CE15 | X | X | X | ○ | ○ | ○ |
| CEE16 | IE1 | CE16 | X | X | ○ | ○ | ○ | ○ |
| CEE17 | IE1 | CE17 | X | X | ○ | ○ | ○ | ○ |
| CEE18 | IE1 | CE18 | X | X | | ○ | ○ | ○ |
| CEE19 | IE1 | CE19 | X | X | ○ | X | X | ○ |
| IEE9 | IE1 | IE9 | ○ | ○ | ○ | ○ | X | X |
| CEE20 | IE1 | CE21 | ○ | ○ | X | X | ○ | ○ |

IE: Inventive Example,
CE: Comparative Example,
IEE: Inventive Experimental Example,
CEE: Comparative Experimental Example As illustrated in Table 4, it can be seen that when compositions of Inventive Examples 5 to 9 according to the present disclosure were used as topcoat coating compositions, sulfuric acid corrosion resistance, complex corrosion resistance, coating film adhesion, and sulfuric acid corrosion resistance after processing were very excellent. In addition, since surface defects such as boiling did not occur during the coating and drying process, very good surface quality was secured.

In Comparative Experimental Example 12, it can be seen that since an excessive amount of the colloidal silica was added, and a large amount of residual silica in the reaction with the silane remained, which hindered formation of the coating layer, sulfuric acid corrosion resistance and complex corrosion resistance were significantly lowered, and coating film adhesion was also inferior. In Comparative Experimental Example 13, it can be seen that since a surface of the colloidal silica was not sufficiently modified due to an insufficient amount of silane, as in Comparative Experimental Example 1, and a large amount of residual silica interfered with formation of the coating layer, sulfuric acid corrosion resistance and complex corrosion resistance were decreased, and coated film adhesion was inferior. In Comparative Experimental Example 14, it can be seen that since an excessive amount of the acidity control agent was added to increase a molecular weight of an organic-inorganic mixed resin of silica modified with silane, a monomer, and an organic resin, gelation of a solution occurred, or complex corrosion resistance were deteriorated even when the coating was applied. In addition, corrosion of the steel plate proceeded due to the residual acidity control agent. In Comparative Experimental Example 15, it can be seen that since no solvent was included, gelation easily occurred in the manufacturing process of the solution composition, and sulfuric acid corrosion resistance and the complex corrosion resistance were deteriorated even when the coating was applied. In Comparative Experimental Example 16 and Comparative Experimental Example 17, it can be seen that since an excess amount of a monomer and an organic resin were added, respectively, sulfuric acid corrosion resistance those of the inorganic component. In Comparative Experimental Example 18, it can be seen that since an excessive amount of silane was added, organic gas was discharged due to thermal decomposition during the preparation of the solution composition, and sulfuric acid corrosion resistance after coating was lowered due to a large amount of residual silane. In Comparative Experimental Example 19, it can be seen that since a thickness of the coating layer was insufficient, sulfuric acid corrosion resistance, complex corrosion resistance, sulfuric acid corrosion resistance after processing, and long-term corrosion resistance were inferior. In Comparative Experimental Example 20, it can be seen that since a thickness of the coating layer exceeded an appropriate thickness, coating film adhesion and sulfuric acid corrosion resistance after processing were deteriorated.

While example embodiments have been shown and described above, it will be apparent to those skilled in the art that modifications and variations could be made without departing from the scope of the present disclosure as defined by the appended claims.

The invention claimed is:

1. A bilayer composition for surface treatment of a steel plate, comprising:
   an undercoat coating composition comprising 1 to 12 wt % of a phenoxy resin, 0.001 to 1.0 wt % of colloidal silica, 0.001 to 1.0 wt % of a silane coupling agent, 0.1 to 1.0 wt % of a corrosion inhibitor, 0.001 to 1.0 wt % of a phosphoric acid compound, and a balance of water, based on a total weight of the undercoat coating composition; and
   a topcoat coating composition applied to the undercoat coating composition to be dried, and comprising 0.1 to 5.0 wt % of an acrylic acid resin, 30 to 50 wt % of colloidal silica, 40 to 60 wt % of alkoxy silane, 5 to 15 wt % of an acrylate-based monomer, 0.01 to 1.00 wt % of an acidity control agent, and a balance of an organic solvent, based on a total weight of the topcoat coating composition,
   wherein the corrosion inhibitor is at least one selected from the group consisting of hexafluorozirconic acid, hexafluorotitanic acid, ammonium hexafluorozirconate, and ammonium hexafluorotitannate,
wherein the phosphoric acid compound is at least one selected from the group consisting of polyphosphoric acid, phosphoric acid, zinc phosphate, manganese phosphate, phosphoric acid derivatives, and phosphorous acid,
wherein a thickness of the undercoat coating is 0.001 to 10 μm and a thickness of the topcoat coating is 0.1 to 50 μm.

2. The bilayer composition of claim 1, wherein the topcoat coating composition further comprises 0.01 to 12.00 wt % of a long-term corrosion resistance increasing agent,
wherein the long-term corrosion resistance increasing agent is at least one selected from the group consisting of cerium (Ill) nitrate, hydronium cerium nitrate hydrate, cerium nitrate hexahydrate, cerium (IV) nitrate, dipotassium diaquapentanitratocerate, dipotassium hexanitratocerate, tripotasium diseriumnitrate, diammonium diaquapentanitratocerate dihydrate, dirubidium diaquapentanitratocerate dihydrate, dicesium diaquapentanitratocerate dihydrate, dithallium diaquapentanitratocerate dihydrate, bis{ 4-[(4H-1,2,4-triazol-4-yl)iminomethyl]pyridinium}aquapentanitratocerate (Ill), 1, 10-phenanthroline H-diaquapentanitratocerate, hydronium cerium nitrate hydrate, ceric magnesium nitrate, ceric zinc nitrate, ceric nickel nitrate, ceric cobalt nitrate, and ceric manganese nitrate.

3. The bilayer composition of claim 1, wherein the phenoxy resin of the undercoat coating composition is at least one resin selected from the group consisting of a bisphenol A phenoxy resin, a bisphenol F phenoxy resin, a bisphenol AF phenoxy resin, a bisphenol S phenoxy resin, a bromide bisphenol A phenoxy resin, a bromide bisphenol F phenoxy resin, and a phosphorus-containing phenoxy resin.

4. The bilayer composition of claim 1, wherein the silane coupling agent of the undercoat coating composition is at least one selected from the group consisting of vinylchlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyldiethoxysilane, 3-glycidoxypropyltriethoxysilane, p-styryltrimethoxysilane, 3-methacryloxypropyltriethoxysilane, 3-methacryloxypropylfimethoxysilane, 3-methacryloxypropylmethyldimethoxysilane, 3-methacryloxypropylmethyldiethoxysilane, 3-acryloxypropyltrimethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, and 3-isocyanatopropyltriethoxysilane.

5. The bilayer composition of claim 1, wherein the long-term corrosion resistance improving agent of the undercoat coating composition is a phosphoric acid mixture obtained by mixing phosphoric acid and manganese phosphate in a weight ratio of 1:2 to 2:1.

6. The bilayer composition of claim 1, wherein the colloidal silica is an aqueous colloidal silica having a solid content of 20 to 30 wt %.

7. The bilayer composition of claim 1, wherein the acrylic acid resin of the topcoat coating composition is at least one selected from the group consisting of poly(meth)acrylic acid, a copolymer of acrylic acid and methacrylic acid, and a copolymer of ethylene and acrylic monomers.

8. The bilayer composition of claim 1, wherein the alkoxy silane of the topcoat coating composition is at least one selected from the group consisting of vinylvinyltrimethoxysilane, vinyltriethoxysilane, vinyltriisopropoxysilane, 3-methacryloxypropyltrimethoxysilane, 2-glycidyloxypropyltrimethoxysilane, 2-glycidyloxypropyltriethoxysilane, 2-aminopropyltriethoxysilane, 2-ureidoalkyltriethoxysilane, tetraethoxysilane, triethoxyphenylsilane, and trimethoxyphenylsilane.

9. The bilayer composition of claim 1, wherein the acrylate-based monomer of the topcoat coating composition is at least one selected from the group consisting of acrylic acid (glacial), methyl acrylate, ethyl acrylate, butyl acrylate, 2-ethylhexyl acrylate, isobutyl acrylate, tert-butyl acrylate, tert-butyl methacrylate, butanediol monoacrylate, lauryl acrylate, dimethylaminoethyl acrylate, and dihydrodicyclopentadienyl acrylate.

10. The bilayer composition of claim 1, wherein the acidity control agent of the topcoat coating composition is an organic acid, an inorganic acid, or a combination thereof.

11. The bilayer composition of claim 1, wherein the organic solvent of the topcoat coating composition is alcohol.

12. The bilayer composition of claim 1, wherein the undercoat coating composition and the topcoat coating composition are stored in separate containers before being applied to an object to be coated.

13. A method for surface treatment of a steel plate for improving corrosion resistance, using the bilayer composition of claim 1, comprising:
applying the undercoat coating composition to the steel plate to form an undercoat layer;
drying the undercoat layer at a temperature of 40 to 80° C.;
applying the topcoat coating composition to the steel plate to form a topcoat layer; and
drying the topcoat layer at a temperature of 200 to 300° C.

14. A surface-treated steel plate, prepared using the bilayer composition of claim 1, comprising:
a surface treatment layer on which an undercoat layer formed of the undercoat coating composition and a topcoat layer disposed on the undercoat layer and formed of the topcoat coating composition are stacked, on at least one surface of the surface treatment layer.

\* \* \* \* \*